(12) United States Patent
Schultz

(10) Patent No.: US 9,959,667 B2
(45) Date of Patent: May 1, 2018

(54) METHOD FOR THE AUTOMATIC MATERIAL CLASSIFICATION AND TEXTURE SIMULATION FOR 3D MODELS

(71) Applicant: Pictometry International Corp., Rochester, NY (US)

(72) Inventor: Stephen Schultz, West Henrietta, NY (US)

(73) Assignee: Pictometry International Corp., Rochester, NY (US)

( * ) Notice: Subject to any disclaimer, the term of this patent is extended or adjusted under 35 U.S.C. 154(b) by 0 days. days.

(21) Appl. No.: 15/142,361

(22) Filed: Apr. 29, 2016

(65) Prior Publication Data
US 2016/0321839 A1 Nov. 3, 2016

Related U.S. Application Data

(63) Continuation of application No. 12/605,980, filed on Oct. 26, 2009, now Pat. No. 9,330,494.

(51) Int. Cl.
*G09G 5/00* (2006.01)
*G06T 17/05* (2011.01)
(Continued)

(52) U.S. Cl.
CPC ............ *G06T 17/05* (2013.01); *G06T 15/005* (2013.01); *G06T 15/04* (2013.01); *G09G 5/363* (2013.01); *G06T 1/60* (2013.01); *G06T 11/001* (2013.01)

(58) Field of Classification Search
CPC ..... G06T 15/005; G06T 19/00; G06T 11/001; G06T 11/40; G06T 11/60
See application file for complete search history.

(56) References Cited

U.S. PATENT DOCUMENTS 2,273,876 A   2/1942  Lutz et al.
3,153,784 A  10/1964  Petrides et al.
(Continued)

FOREIGN PATENT DOCUMENTS

AT    331204 T    7/2006
AU    9783798     4/1999
(Continued)

OTHER PUBLICATIONS

Ackermann, Prospects of Kinematic GPS Aerial Triangulation, ITC Journal, 1992.
(Continued)

*Primary Examiner* — Abderrahim Merouan
(74) *Attorney, Agent, or Firm* — Dunlap Codding, P.C.

(57) ABSTRACT

A method of automatically transforming a computerized 3D model having regions of images utilized as textures on one or more physical objects represented in the 3D model (such as building sides and roofs, walls, landscapes, mountain sides, trees and the like) to include material property information for one or more regions of the textures of the 3D model. In this method, image textures applied to the 3D model are examined by comparing, utilizing a computer, at least a portion of each image texture to entries in a palette of material entries. The material palette entry that best matches the one contained in the image texture is assigned to indicate a physical material of the physical object represented by the 3D model. Then, material property information is stored in the computerized 3D model for the image textures that are assigned a material palette entry.

19 Claims, 12 Drawing Sheets

(51) Int. Cl.
*G06T 15/00* (2011.01)
*G09G 5/36* (2006.01)
*G06T 15/04* (2011.01)
*G06T 11/00* (2006.01)
*G06T 1/60* (2006.01)

(56) References Cited

U.S. PATENT DOCUMENTS

| | | |
|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,710,878 A | 1/1998 | McCoy et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,473,090 B1 | 10/2002 | Mayer |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,735,557 B1 | 5/2004 | Castellar et al. |
| 6,747,686 B1 | 6/2004 | Bennett |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,142,984 B2 | 11/2006 | Rahmes et al. |
| 7,233,691 B2 | 6/2007 | Setterholm |
| 7,262,790 B2 | 8/2007 | Bakewell |
| 7,348,895 B2 | 3/2008 | Lagassey |
| 9,082,162 B2 | 7/2015 | Gokturk et al. |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0214585 A1 | 11/2003 | Bakewell |
| 2004/0105090 A1 | 6/2004 | Schultz et al. |
| 2004/0167709 A1 | 8/2004 | Smitherman et al. |
| 2005/0073241 A1 | 4/2005 | Yamauchi et al. |
| 2005/0088251 A1 | 4/2005 | Matsumoto |
| 2005/0128212 A1* | 6/2005 | Edecker ............... G06T 17/05 345/582 |
| 2005/0169521 A1 | 8/2005 | Hel-Or |
| 2006/0028550 A1 | 2/2006 | Palmer et al. |
| 2006/0092043 A1 | 5/2006 | Lagassey |
| 2006/0238383 A1 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0237420 A1 | 10/2007 | Steedly et al. |
| 2008/0024512 A1* | 1/2008 | Chuter ............... G06T 15/04 345/584 |

(56) References Cited

U.S. PATENT DOCUMENTS

| | | |
|---|---|---|
| 2008/0120031 A1 | 5/2008 | Rosenfeld et al. |
| 2008/0123994 A1 | 5/2008 | Schultz et al. |
| 2008/0221843 A1 | 9/2008 | Shenkar et al. |

FOREIGN PATENT DOCUMENTS

| | | |
|---|---|---|
| AU | 3874400 | 9/2000 |
| AU | 03/291364 | 6/2004 |
| BR | 0316110 | 9/2005 |
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1180967 | 2/2002 |
| EP | 1418402 | 5/2004 |
| EP | 1696204 | 8/2006 |
| ES | 2266704 T | 3/2007 |
| HK | 1088421 A | 11/2006 |
| JP | 2003/317089 A | 11/2003 |
| JP | 2006505794 T | 2/2006 |
| MX | PA05004987 | 2/2006 |
| SG | 2005/03341 | 5/2007 |
| WO | WO99/18732 | 4/1999 |
| WO | WO/00/53090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.—Jan. 30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in the Grass GIS", Geoscience and Remote Sensing Symposium, 4:2227-2229, 1991.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=, 1999.

Slaymaker, et al., "A System for Real-time Generation of Georeferenced Terrain Models", 4232A-08, SPIE Enabling Technologies for Law Enforcement Boston, MA, ftp://vis-ftp.cs.umass.edu/Papers/schultz/spie2000.pdf, 2000.

Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.

Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.

Star et al., "Geographic Information Systems an Introduction", Prentice-Hall, 1990.

Tomasi et al., "Shape and Motion from Image Streams: a Factorization Method"—Full Report on the Orthographic Case, pp. 9795-9802, 1992.

Warren, Fire Mapping with the Fire Mousetrap, Aviation and Fire Management, Advanced Electronics System Development Group, USDA Forest Service, 1986.

Welch, R., "Desktop Mapping with Personal Computers", Photogrammetric Engineering and Remote Sensing, 1651-1662, 1989.

Westervelt, James, "Introduction to GRASS 4", pp. 1-25, 1991.

"RGB Spectrum Videographics Report, vol. 4, No. 1, McDonnell Douglas Integrates RGB Spectrum Systems in Helicopter Simulators", pp. 1-6, 1995.

RGB "Computer Wall", RGB Spectrum, 4 pages, 1995.

"The First Scan Converter with Digital Video Output", Introducing . . . The RGB/Videolink 1700D-1, RGB Spectrum, 2 pages, 1995.

ERDAS Field Guide, Version 7.4, A Manual for a commercial image processing system, 1990.

"Image Measurement and Aerial Photography", Magazine for all branches of Photogrammetry and its fringe areas, Organ of the German Photogrammetry Association, Berlin-Wilmersdorf, No. 1, 1958.

"Airvideo Analysis", MicroImages, Inc., Lincoln, NE, 1 page, Dec. 1992.

(56) References Cited

OTHER PUBLICATIONS

Zhu, Zhigang, Hanson, Allen R., "Mosaic-Based 3D Scene Representation and Rendering", Image Processing, 2005, ICIP 2005, IEEE International Conference on 1(2005).

Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.

Mostafa, et al., "Ground Accuracy from Directly Georeferenced Imagery", Published in GIM International vol. 14 N. Dec. 12, 2000.

Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.

Mostafa, M.R. And Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.

Mostafa, et al., "Airborne DGPS Without Dedicated Base Stations for Mapping Applications", Proceedings of ION-GPS 2001, Salt Lake City, Utah, USA, Sep. 11-14.

Mostafa, "ISAT Direct Exterior Orientation QA/QC Strategy Using POS Data", Proceedings of OEEPE Workshop: Integrated Sensor Orientation, Hanover, Germany, Sep. 17-18, 2001.

Mostafa, "Camera/IMU Boresight Calibration: New Advances and Performance Analysis", Proceedings of the ASPRS Annual Meeting, Washington, D.C., Apr. 21-26, 2002.

Hiatt, "Sensor Integration Aids Mapping at Ground Zero", Photogrammetric Engineering and Remote Sensing, Sep. 2002, p. 877-878.

Mostafa, "Precision Aircraft GPS Positioning Using CORS", Photogrammetric Engineering and Remote Sensing, Nov. 2002, p. 1125-1126.

Artes F., & Hutton, J., "GPS and Inertial Navigation Delivering", Sep. 2005, GEOconnexion International Magazine, p. 52-53.

POS AV "Digital Frame Camera Applications", 3001 Inc., Brochure, 2007.

POS AV "OEM System Specifications", 2005.

"POSTrack V5 Specifications" 2005.

"Protecting Natural Resources with Remote Sensing", Proceeding of the Third Forest Service Remote Sensing Applications Conference—Apr. 9-13, 1990.

Heipke, et al, "Test Goals and Test Set Up for the OEEPE Test—Integrated Sensor Orientation", 1999.

Kumar, et al., "Registration of Video to Georeferenced Imagery", Sarnoff Corporation, CN5300, Princeton, NJ, 1998.

McConnel, Proceedings Aerial Pest Detection and Monitoring Workshop—1994.pdf, USDA Forest Service Forest Pest Management, Northern Region, Intermountain regiion, Forest Insects and Diseases, Pacific Northwest Region.

"Standards for Digital Orthophotos", National Mapping Program Technical Instructions, US Department of the Interior, Dec. 1996.

Tao, "Mobile Mapping Technology for Road Network Data Acquisition", Journal of Geospatial Engineering, vol. 2, No. 2, pp. 1-13, 2000.

"Mobile Mapping Systems Lesson 4", Lesson 4 SURE 382 Geographic Information Systems II, pp. 1-29, Jul. 2, 2006.

Konecny, G., "Mechanische Radialtriangulation mit Konvergentaufnahmen", Bildmessung und Luftbildwesen, 1958, Nr. 1.

Myhre, "ASPRS/ACSM/RT 92" Technical papers, Washington, D.C., vol. 5 Resource Technology 92, Aug. 3-8, 1992.

Rattigan, "Towns get new view from above," *The Boston Globe*, Sep. 5, 2002.

Mostafa, et al., "Digital image georeferencing from a multiple camera system by GPS/INS," *ISP RS Journal of Photogrammetry & Remote Sensing*, 56(I): I-12, Jun. 2001.

Dillow, "Grin, or bare it, for aerial shot," *Orange County Register* (California), Feb. 25, 2001.

Anonymous, "Live automatic coordinates for aerial images," *Advanced Imaging*, 12(6):51, Jun. 1997.

Anonymous, "Pictometry and US Geological Survey announce—Cooperative Research and Development Agreement," Press Release published Oct. 20, 1999.

Miller, "Digital software gives small Arlington the Big Picture," *Government Computer News State & Local*, 7(12), Dec. 2001.

Garrett, "Pictometry: Aerial photography on steroids," *Law Enforcement Technology* 29(7):114-116, Jul. 2002.

Weaver, "County gets an eyeful," *The Post-Standard* (Syracuse, NY), May 18, 2002.

Reed, "Firm gets latitude to map O.C. in 3D," *Orange County Register* (California), Sep. 27, 2000.

Reyes, "Orange County freezes ambitious aerial photography project," *Los Angeles Times*, Oct. 16, 2000.

Australian Government IP Australia; Patent Examination Report No. 1 regarding Australian Patent Application 2010315698; Aug. 15, 2014.

Applicant; Response to Examination Report No. 1 regarding Australian Patent Application 2010315698; Aug. 21, 2015.

Imhof, Ralph K., "Mapping from Oblique Photographs", Manual of Photogrammetry, Chapter 18, 1966.

Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.

Mostafa, et al., System Performance Analysis of INS/DGPS Integrated System for Mobile Mapping System (MMS), Department of Geomatics Engineering, University of Calgary, Commission VI, WG VI/4, Mar. 2004.

"POS AV" APPLANIX, Product Outline, airborne@applanix.com, 3 pages, Mar. 28, 2007.

POSTrack, "Factsheet", APPLANIX, Ontario, Canada, www.applanix.com, Mar. 2007.

POS AV "Digital Scanner Applications", Earthdata Brochure, Mar. 2007.

POS AV "Film Camera Applications" AeroMap Brochure, Mar. 2007.

POS AV "LIDAR Applications" MD Atlantic Brochure, Mar. 2007.

POS AV "Synthetic Aperture Radar Applications", Overview, Orbisat Brochure, Mar. 2007.

Canadian Intellectual Property Office; Office Action dated Oct. 25, 2016 regarding Canadian Patent Application No. 2,778,267.

European Patent Office; Supplementary Partial European Search Report and Lack of Unity of Invention dated Mar. 21, 2017 regarding European Patent Application No. 10828764.0.

Partial Supplementary European Search Report regarding EP App. No. 10828764.0 dated Mar. 21, 2017, 8 pages.

Extended European Search Report regarding EP App. No. 10828764.0 dated Jul. 12, 2017.

Goldberg et al., "Extracting geographic features from the Internet to automatically build detailed regional gazetteers," International Journal of Geographical Information Science, 23:1, 93-128, Jan. 2009.

Pictometry International Corp., Response to Oct. 25, 2016 Official Action from the Canadian Intellectual Property Office regarding Canadian Patent Application No. 2,778,267, "A Method for Automatic Material Classification and Texture Simulation for 3D Models," filed Apr. 25, 2017.

Canadian Intellectual Property Office, Official Action regarding Canadian Patent Application No. 2,778,267, "A Method for Automatic Material Classification and Texture Simulation for 3D Models," dated Oct. 19, 2017.

\* cited by examiner

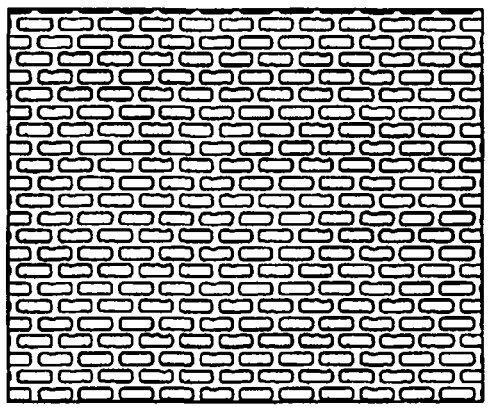
BRICK: (0.86)
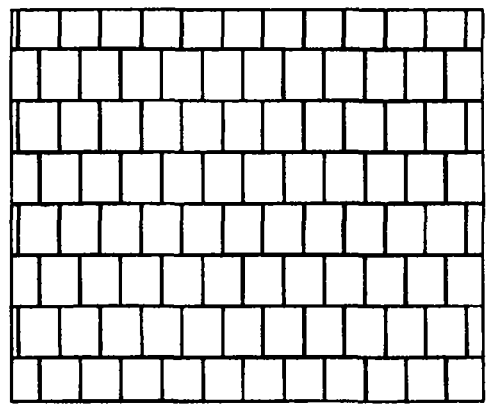
CEMENT BLOCK: (0.74)
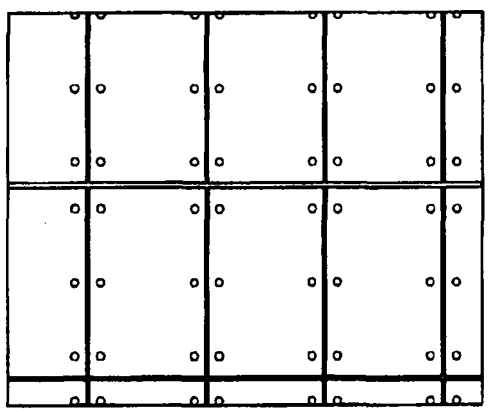
CEMENT: (0.72)
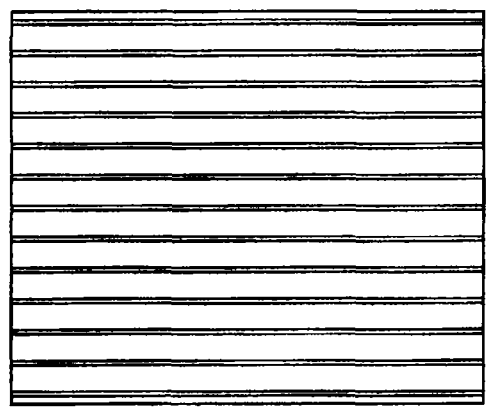
SIDING: (0.21)
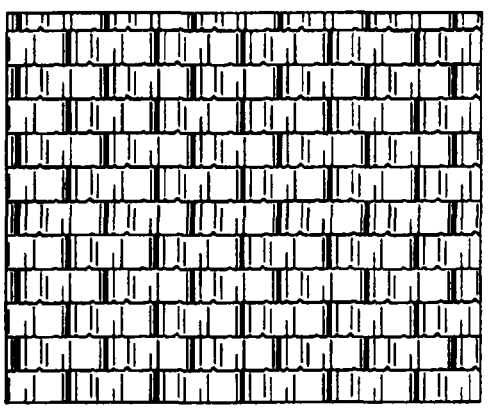
ROOF SHINGLES: (0.12)
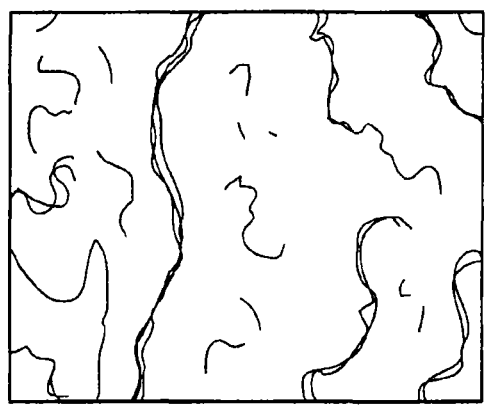
MARBLE: (0.45)
FIG. 4

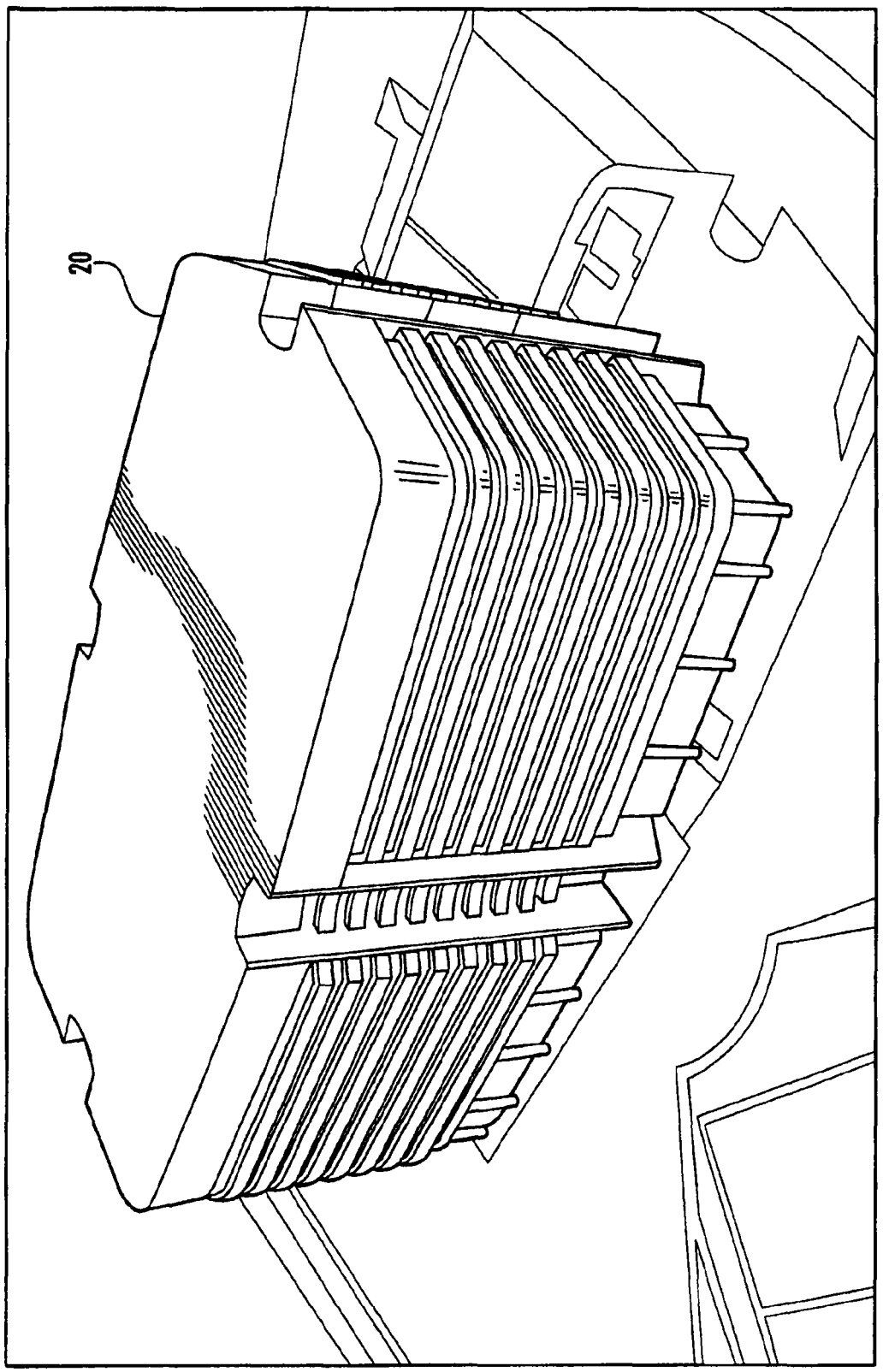

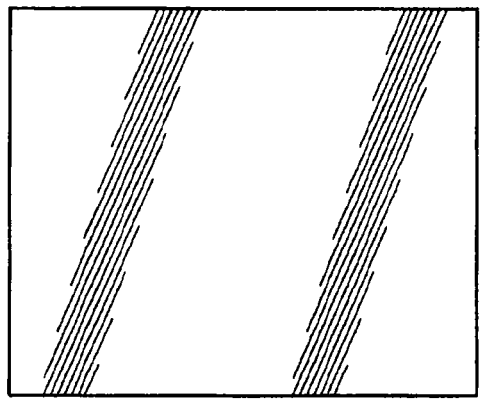
TRANSPARENT GLASS: (0.82)
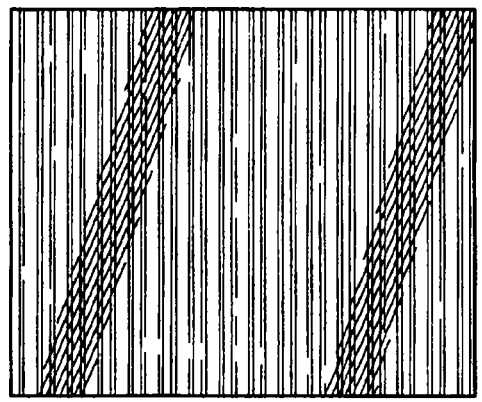
TRANSPARENT CORRUGATED GLASS: (0.36)
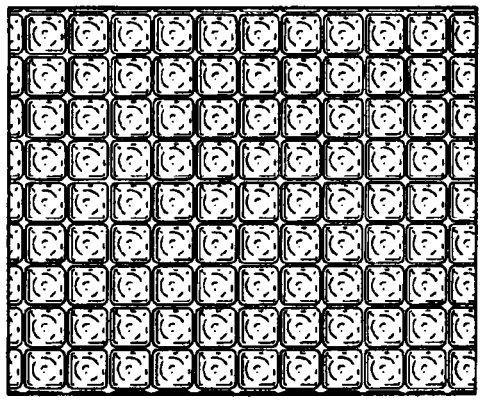
BLOCK GLASS: (0.42)
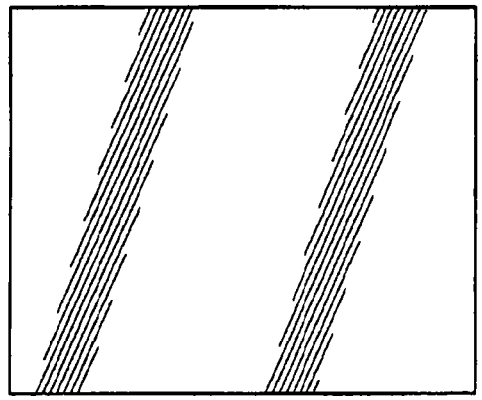
CRUSHED RESIN GLASS: (0.76)
FIG. 8

METHOD FOR THE AUTOMATIC MATERIAL CLASSIFICATION AND TEXTURE SIMULATION FOR 3D MODELS

INCORPORATION BY REFERENCE

The present patent application claims priority to and is a continuation of the patent application identified by U.S. Ser. No. 12/605,980, filed Oct. 26, 2009, titled "Method for the Automatic Material Classification and Texture Simulation for 3D Models", the entire contents of which are hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE §1.52(E)(5)). THE TOTAL NUMBER OF COMPACT DISCS INCLUDING DUPLICATES AND THE FILES ON EACH COMPACT DISC SHALL BE SPECIFIED

Not Applicable.

BACKGROUND OF THE INVENTION

1. Field of the Invention

The presently claimed and disclosed invention(s) relate to a material property determination system, and an automated method of assigning material properties to image textures within a 3D model. More particularly, but not by way of limitation, the presently claimed and disclosed invention(s) uses an automated methodology to determine and assign material properties to images textures applied to the 3D model by comparing each texture to entries in a palette of material entries and assigning the material palette entry that best matches the one contained in the 3D model image texture.

2. Background of the Art

In the remote sensing/aerial imaging industry, imagery is used to capture views of a geographic area and be able to measure objects and structures within the images as well as to be able to determine geographic locations of points within the image. These are generally referred to as "geo-referenced images" and come in two basic categories:

1. Captured Imagery—these images have the appearance they were captured by the camera or sensor employed.
2. Projected Imagery—these images have been processed and converted such that they conform to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a nadir image—that is, an image captured with the camera pointing straight down.

It is often quite desirable to combine multiple images into a larger composite image such that the image covers a larger geographic area on the ground. The most common form of this composite image is the "ortho-mosaic image" which is an image created from a series of overlapping or adjacent nadir images that are mathematically combined into a single ortho-rectified image.

Technology advancements within the computerized three-dimensional modeling industry are providing avenues for physical simulation of real-life and hypothetical situations on computer systems. These models can provide valuable information for strategic and tactical planning. For example, three-dimensional models of city streets can provide first responders information regarding current city developments including entryway locations, building recognition, and the like. This information is valuable in reducing response time during emergency conditions. Further, emergency personal can train for emergency situations through simulated scenarios provided by or with the three dimensional models.

The introduction of metric oblique imagery by Pictometry International Corp has led to the creation of very photo-realistic computerized 3D models by the use of regions within oblique images as textures on the buildings, structures, and objects in the 3D models. This practice not only results in computerized 3D models that are very visually pleasing, but they also contain information about the objects themselves, including clues to the material composition used to construct those objects.

Identifying the material composition is very important when using the 3D models for simulating real-life and hypothetical situations on computer systems, such as blast simulations, weapons penetration, radio wave propagation, signal reflectivity, and other scientific studies where the material composition comes into play in the calculations. Traditionally the properties of these materials have been entered by hand in a very laborious process where an operator selects an individual building or object in the model and then assigns the appropriate building material. Prior to the creation of photo-realistic 3D models from oblique images, this process could even involve field visits to determine the material composition.

It is highly desirable to automate this process, for two primary reasons: speed of production and cost savings. However, to date, an automated method has been elusive because while object or material recognition is a rather easy process for people, it is very difficult for computers. To date, most attempts at automated material classification have concentrated on multi-spectral image collection in hopes that enough color signatures can uniquely identify each material. However, in most cases, multi-spectral data is not available or is limited to only a few color bands and therefore insufficient to differentiate between materials.

SUMMARY OF THE INVENTION

This invention allows for the automated creation of a 3D model that has (1) a natural appearance, (2) material information stored in the 3D model and (3) is preferably geo-referenced to maintain the ability to measure and determine geographic coordinates. While the preferred embodiment uses aerial oblique imagery for the textures, the invention will also work with non-aerial oblique imagery captured in a variety of ways, including but not limited to cameras mounted obliquely on a vertical pole, hand-held cameras aimed obliquely, and cameras mounted at oblique angles on an underwater probe, as well as other types of imagery such as nadir imagery.

In one version, the present invention is directed to a method of automatically transforming a computerized 3D model having regions of images utilized as textures on one or more physical objects represented in the 3D model (such as building sides and roofs, walls, landscapes, mountain sides, trees and the like) to include material property information for one or more regions of the textures of the 3D model. In this method, image textures applied to the 3D model are examined by comparing, utilizing a computer, at least a portion of each image texture to entries in a palette of material entries. The material palette entry that best matches the one contained in the image texture is assigned to indicate a physical material of the physical object represented by the 3D model. Then, material property information is stored in the computerized 3D model for the image textures that are assigned a material palette entry.

To improve the comparison between the texture and the entries in the material palette, the entries in the material palette can be modified such that their image resolution matches the image resolution contained in the 3D model image textures prior to comparison.

The material property information stored in the computerized 3D model can be stored in fields in the computerized 3D model data directly, or a unique identifier for the selected material palette entry, or an address to information where the selected material palette entry (or material property) is stored or identified, or other information associated with a material palette entry can be stored in the 3D model data and subsequently used to retrieve the material property information from a list or database of material properties.

The entries in the palette of material entries can be utilized to texture one or more of the physical objects within the computerized 3D model. That is, once the material palette entry that best matches the one contained in the image texture is assigned to indicate a physical material of the physical object represented by the 3D model, the material palette entry can be utilized as a simulated texture to replace or enhance the texture one or more physical objects represented in the 3D model the 3D model.

BRIEF DESCRIPTION OF THE SEVERAL VIEWS OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

The patent or application file contains at least one drawing executed in color. Copies of the patent or patent application publication with color drawing(s) will be provided by the Office upon request and payment of the necessary fee.

FIG. 4 illustrates a palette of building materials in accordance with the present invention, showing their numeric match value in relation to the selected building texture of FIG. 3, with the highest score highlighted.

FIG. 6 illustrates a portion of the computerized 3D model depicted in FIG. 1 with the real world and simulated textures combined in accordance with the present invention.

FIG. 8 illustrates an exemplary palette of images representing a portion of a physical object, e.g. representative of types of glass, with a numeric match value in relation to the selected windows of FIG. 7, with the highest score highlighted.

DETAILED DESCRIPTION OF THE PRESENTLY DISCLOSED AND CLAIMED INVENTION

Figure 1:
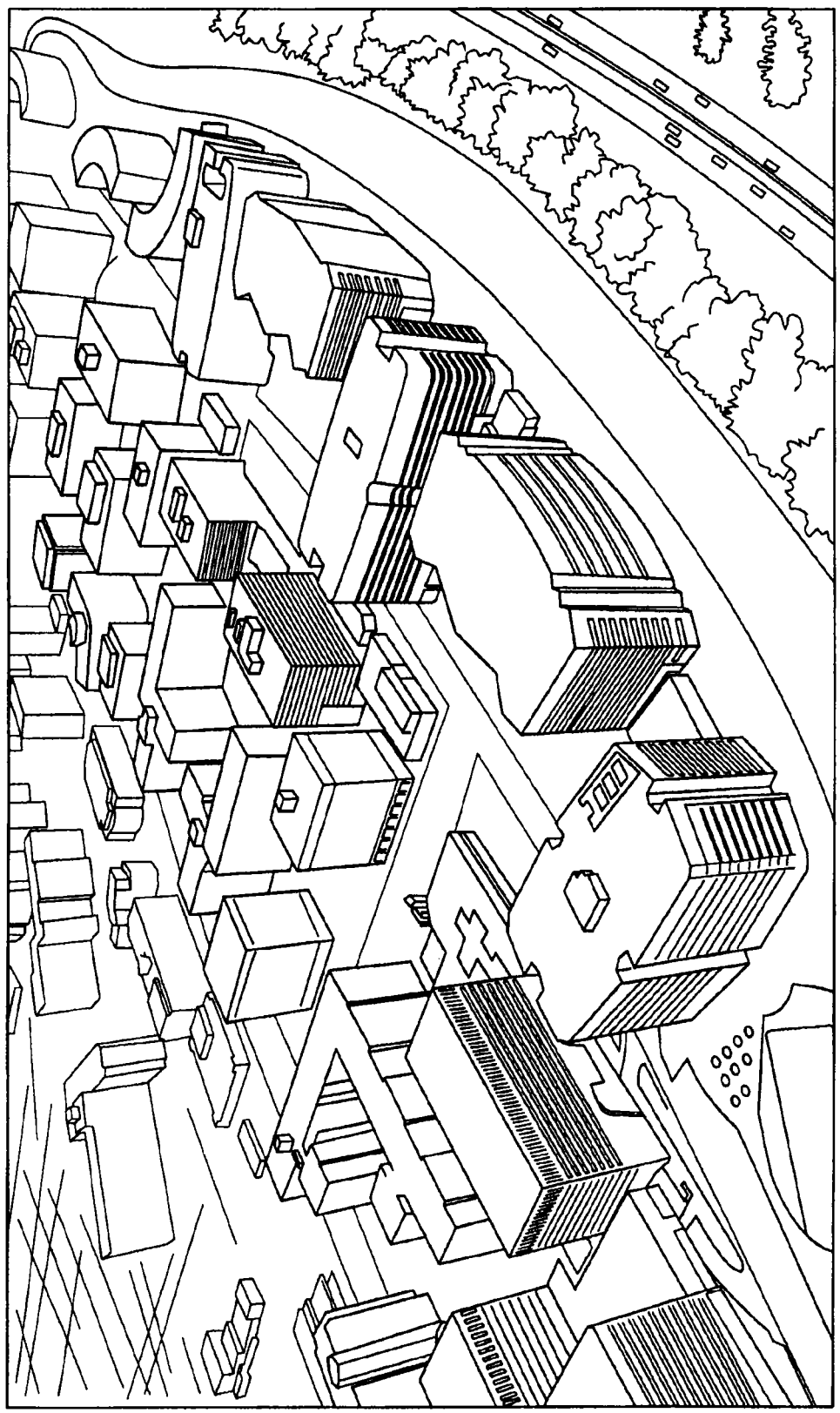
FIG. 1 illustrates an exemplary computerized 3D model with real world textures zoomed out to show photo-realism.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

The presently claimed and disclosed invention(s) relate to a material property determination system, and an automated method of assigning material properties to image textures within a 3D model. More particularly, but not by way of limitation, the presently claimed and disclosed invention(s) uses an automated methodology to determine and assign material properties to images textures applied to the 3D model by comparing each image texture to entries in a palette of images representing material entries and assigning the image representing the material palette entry that best matches the one contained in the 3D model image texture.

The term texture, as used herein refers to an image, e.g., a digital image, representing a surface, a material, a pattern or even a picture. The texture can be created in a variety of manners, such as being generated from a captured or projected image, or generated by an artist or a designer using a bitmap editor software such as Adobe® Photoshop® or Gimp or by scanning an image and, if necessary or desirable, retouching, color balancing, or otherwise processing it on a computer such as a personal computer, dedicated server or the like.

The texture can be in a suitable format, such as a bitmap format, or a vector format. The texture can be built as a large image, larger than the final destination (such as page, for example) so as to fill the complete area without repeating the image (thus avoiding visible seams). Also bitmap textures can be created to be used as repetitive patterns to fill an infinite area. The borders of these patterns or small textures should be treated to give a seamless appearance when applied to an image, unless, of course, the seam is something to be shown.

When designed for print, the textures should be created in high-resolution in order to achieve good results in the final print.

When the textures are meant to be used in multimedia, a 3d model or web design, they should be created in a maximum resolution that equals the one of the final display (TV, computer monitor, movie projector, etc.).

The term "palette of material entries" as used herein means a given, finite set of textures representative of material properties of physical materials. In particular, each material palette entry represents a particular type of physical material. As discussed in more detail below, the material palette entry that best matches a particular image texture in the computerized 3D model is assigned to the image texture to indicate a material property of the physical object represented by the 3D model.

The term "3D model" as used herein is a collection of data that represent a 3-dimensional object using a collection of points in 3D space, connected by various geometric entities such as triangles, lines, curved surfaces, etc. The geometric entities are sometimes called "wireframes" in the art. The 3D model can be created manually or automatically. One exemplary method for creating a 3D model is described in a U.S. patent application identified by U.S. Ser. No. 11/998, 974 titled "SYSTEMS AND METHODS FOR RAPID THREE-DIMENSIONAL MODELING WITH REAL FACADE TEXTURE," the entire contents of which are herein incorporated by reference. The 3D model can be constructed in various manners, such as solid or shell, and can either be a stationary 3D model or animated.

In one version, the present invention is directed to a method of automatically transforming a computerized 3D model having portions of images utilized as textures on one or more physical objects represented in the 3D model to include material property information for one or more regions of the textures of the 3D model. See FIG. 1 as an example of such a 3D model having portions of images utilized as textures of one or more physical objects represented in the 3D model. In this method, image textures applied to the 3D model (or to be applied to the 3D model) are examined by comparing, utilizing a computer system 50 (see FIG. 11 as described below), at least a portion of each image texture to entries in a palette of material entries. The material palette entry that best matches the one contained in the image texture is assigned to the image texture to indicate a physical material of the physical object represented by the 3D model. Then, material property information is stored in the computerized 3D model for the image textures that are assigned a material palette entry.

To improve the comparison between the image textures and the entries in the material palette, the entries in the material palette can be modified such that their image resolution matches the image resolution contained in the 3D model image textures prior to comparison.

The material property information stored in the computerized 3D model can be stored in fields in the computerized 3D model data directly, or a unique identifier for the selected material palette entry, or an address to information where the selected material palette entry (or material property) is stored or identified, or other information associated with a material palette entry can be stored in the 3D model data and is subsequently used to retrieve the material property or structural element information from a list or database of material properties. For example, material property or structural element information can be stored as metadata within the 3D model, either appended to the same file or in another file readily accessible (an industry standard practice is to use the same filename but with a different file extension).

In another aspect of the present invention, the entries in the palette of material entries can be utilized to texture one or more of the image textures representing the physical objects within the computerized 3D model. That is, once the material palette entry that best matches the image texture is assigned to indicate a physical material of the physical object represented by the 3D model, the material palette entry can be utilized as a simulated texture to replace or enhance the image texture of one or more physical objects represented in the 3D model.

As would be understood in the art, the presently disclosed and claimed invention would provide the method to do material classification using color imagery (e.g., red, green, and blue color bands) through the use of oblique images. For example, the color oblique imagery is utilized to provide initial image textures for the 3D models and then a palette of possible building materials is compared to the image texture within the 3D model to automatically assign material properties to the portions of the image textures contained within the 3D model representing the physical objects, e.g., the buildings. These methods also provide a means to automatically size and position simulated textures of structural elements, e.g., windows, doors or the like, on the 3D model based on those detected in the actual imagery of textures representing the buildings.

This methodology offers a number of advantages. First, there is no need to do a special data collection in order to make the determinations—normal oblique imagery as textures can be used, such as that described in U.S. Pat. No. 5,247,356 entitled "Method and Apparatus for Mapping and Measuring Land". Second, the method of the present invention is highly automated, requiring only quality control and clean up of any false identifications. Third, by assigning building material properties to the palette of available materials, the resulting 3D model can be used for blast simulations and other analyses that require knowledge of the material composition in the model. Fourth, for applications that require simulated textures, the entry from the material palette can replace the actual oblique image texture in the 3D model, thereby greatly reducing the data content in the scene. Fifth, for applications that require extreme close-up views of the 3D model, the entry from the material palette can be used to produce higher resolution textures of the building than is possible from the original imagery.

Figure 2:
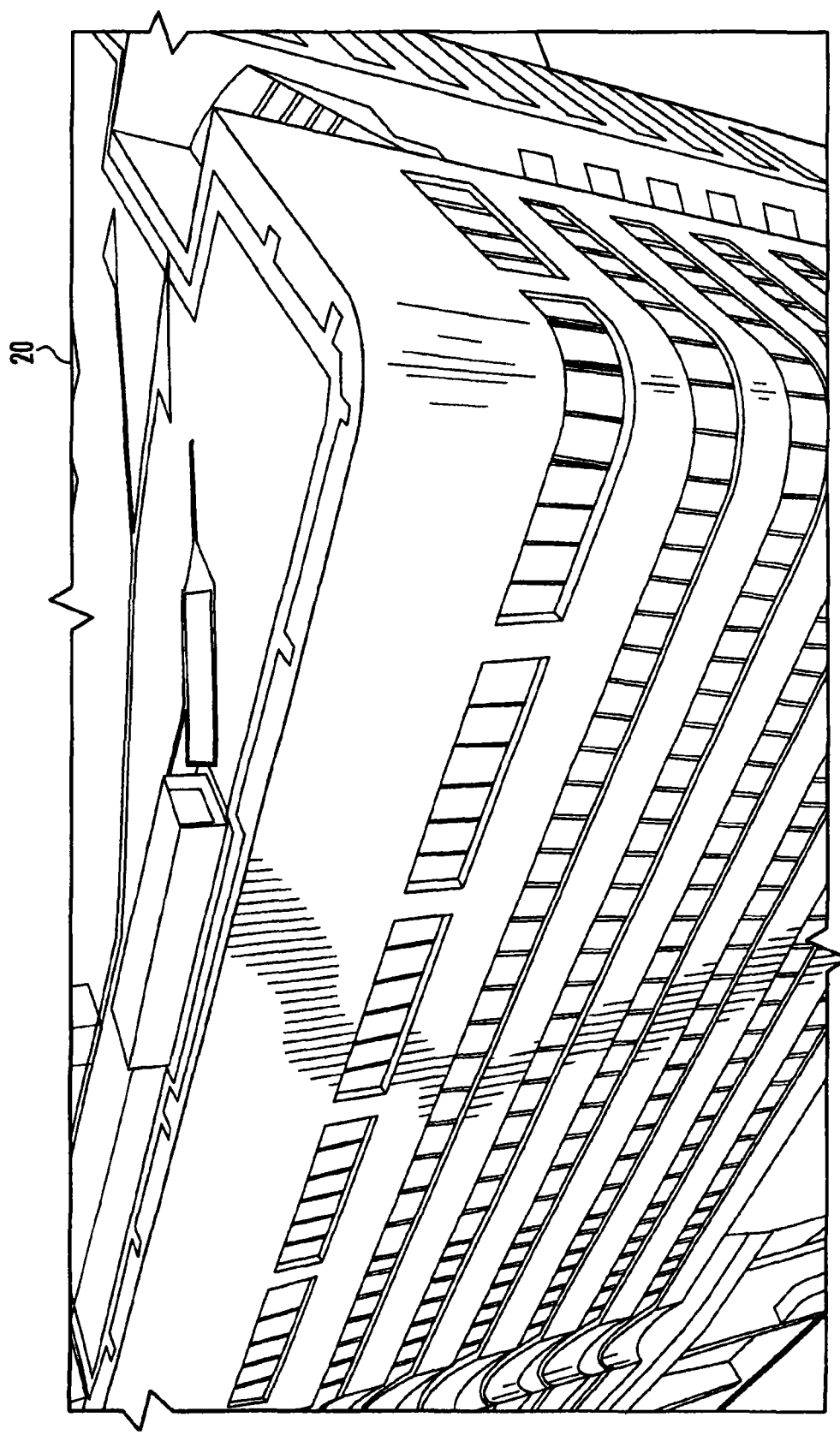
FIG. 2 illustrates a portion of the computerized 3D model depicted in FIG. 1 zoomed in such that the textures are pixilated.

The primary methodology includes the step of comparing a particular building texture with one or more, and preferably each, of the entries in the material palette and then selecting the entry with the best match. To improve on the success rate of the matching process, the entries in the material palette can optionally be pixilated to match the resolution of the actual texture in the 3D model representing the building. FIG. 2 shows a portion of a building 20 shown in FIG. 1 wherein the image is zoomed in to illustrate the pixilation that can occur with differing resolutions of images. This will help make sure that the algorithm is not confused by differences in resolution and differences in patterns caused by the differing resolution.

Figure 3:
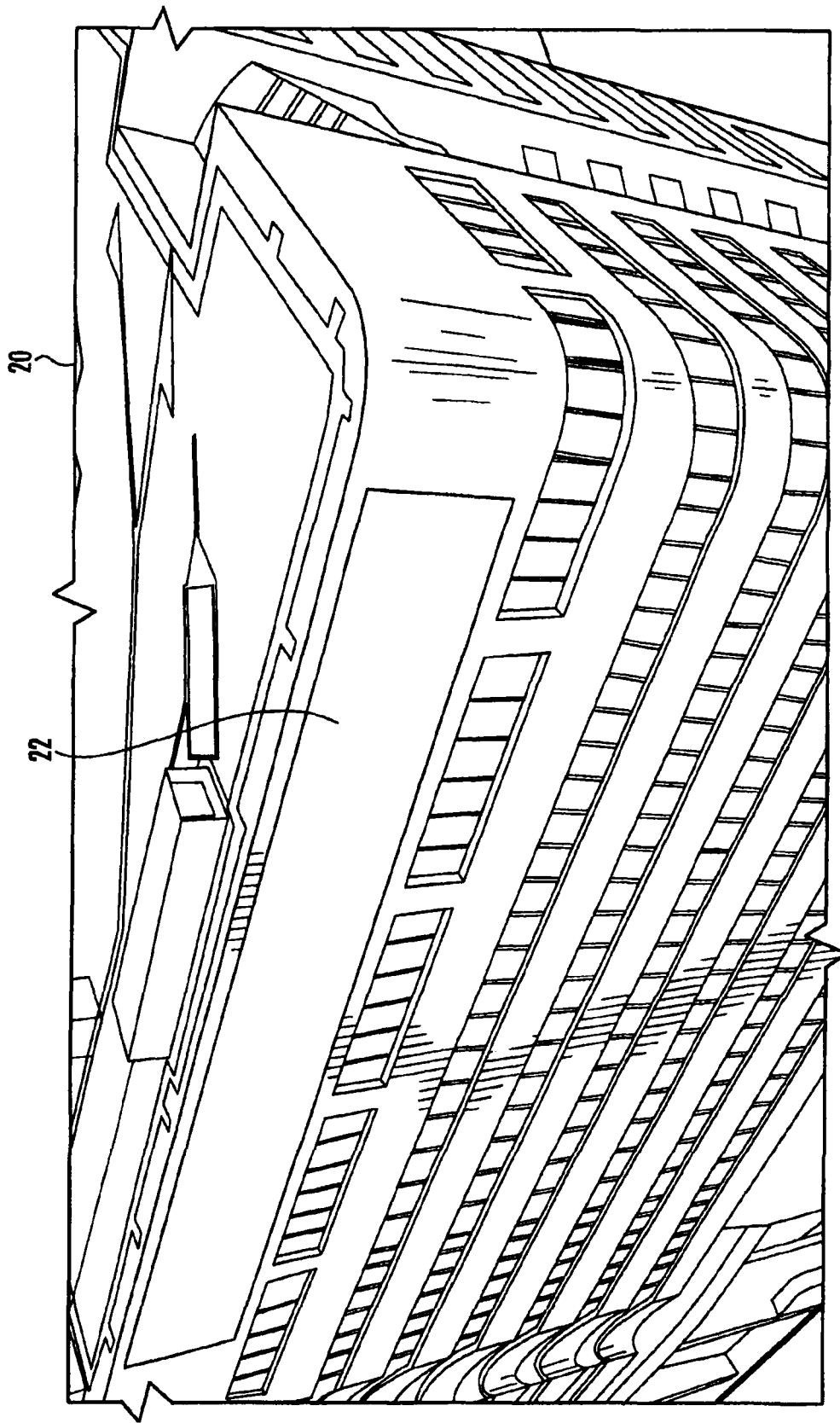
FIG. 3 illustrates a portion of the computerized 3D model depicted in FIG. 1 with one particular building texture highlighted and outlined using an edge detection algorithm.
Figure 7:
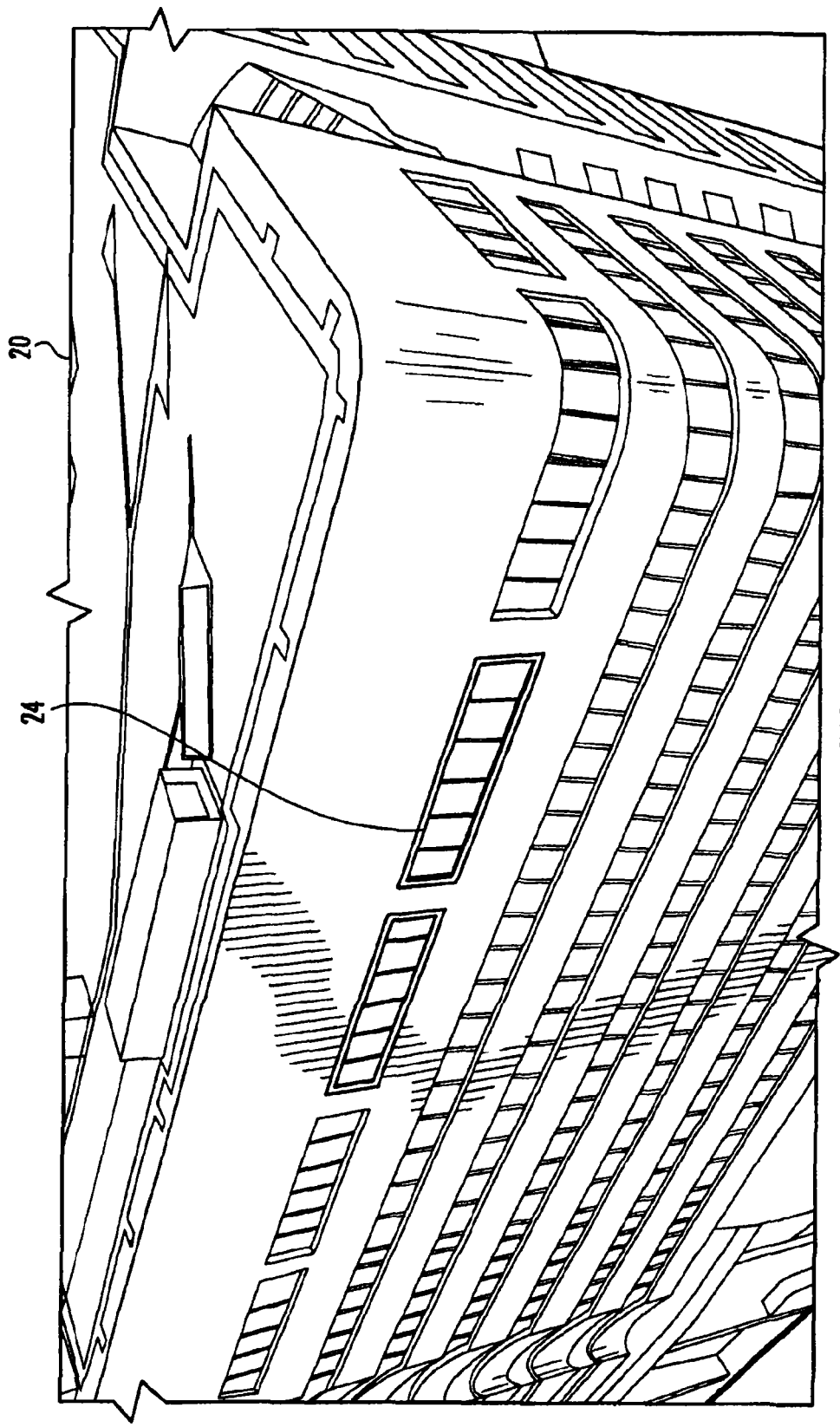
FIG. 7 illustrates a portion of the computerized 3D model depicted in FIG. 1 with two particular windows highlighted and outlined using an edge detection algorithm in accordance with the present invention.

A secondary optional methodology will use an edge detection algorithm to analyze the textures within the 3D model to locate representations of predetermined structural elements, such as structural features, windows and doors, or the absence of a predetermined structural element, such as a void or a hole. FIGS. 3 and 7 illustrate a structural feature (building surface 22 in FIG. 3) and windows 24 (FIG. 7) as detected and outlined by the edge detection algorithm. Once the representations of the predetermined structural elements are located within the textures, such representations of the structural elements are matched to entries in a palette of structural elements textures in a similar methodology as discussed above in order to find the structural element that best matches the representation of the one found in the image texture. In this approach, the size and position of structural element (building surface 22 in FIG. 3 or windows 24 in FIG. 7) will be recorded and the selected entry will then be sized and positioned to match.

In both methods, the material information or structural element information added to the 3D model in accordance with the present invention, such as the material information from the palette entry or the identification, size and position of the structural element, can be stored in fields in the computerized 3D model data directly, or one or more unique identifier(s) for the material or structural element information can be added, or an address to information where the material or structural element information is stored or identified, or other information associated with a material palette entry or structural element entry can be stored in the 3D model data and subsequently used to retrieve the material property information or structural element information from a list or database of material properties.

In practice, the methodology disclosed and claimed herein, consists of multiple steps and data transformations that can be accomplished by one of ordinary skill in the art given the present specification. There are a number of algorithms already known in the art that can scan the textures within the 3D model to locate the structural elements. In addition, follow-on work could create new algorithms specifically designed to deal with the complexities of oblique images.

The textures and the entries in the palettes can be stored in any format; including one of many industry standard image formats such as TIFF, JFIF, TARGA, Windows Bitmap File, PNG or any other industry standard format. FIGS. 4 and 8 illustrate such palette entries wherein the image textures selected and outlined in FIGS. 3 and 7 (building surface 22 in FIG. 3 or windows 24 in FIG. 7) have been compared to the palette entries and the resulting comparison value is indicated next to each palette entry. As would be understood, the palette entry with the highest comparison value would be selected as the palette entry which corresponds to the selected image textures of FIGS. 3 and 7.

Figure 5:
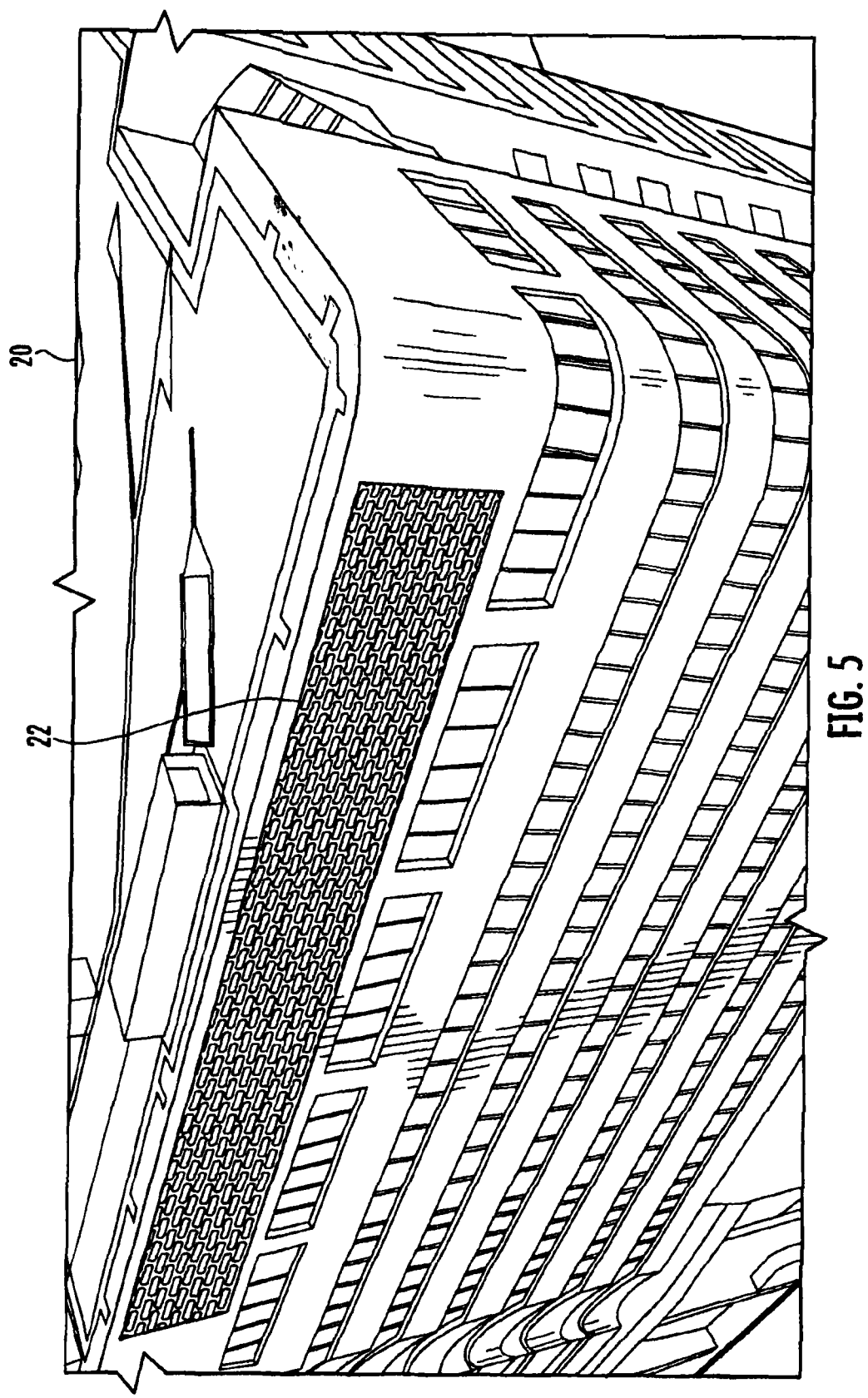
FIG. 5 illustrates the computerized 3D model depicted in FIG. 3 with a real world texture replaced with a simulated texture in accordance with the present invention, and building material properties in a table off to the side.
Figure 9:
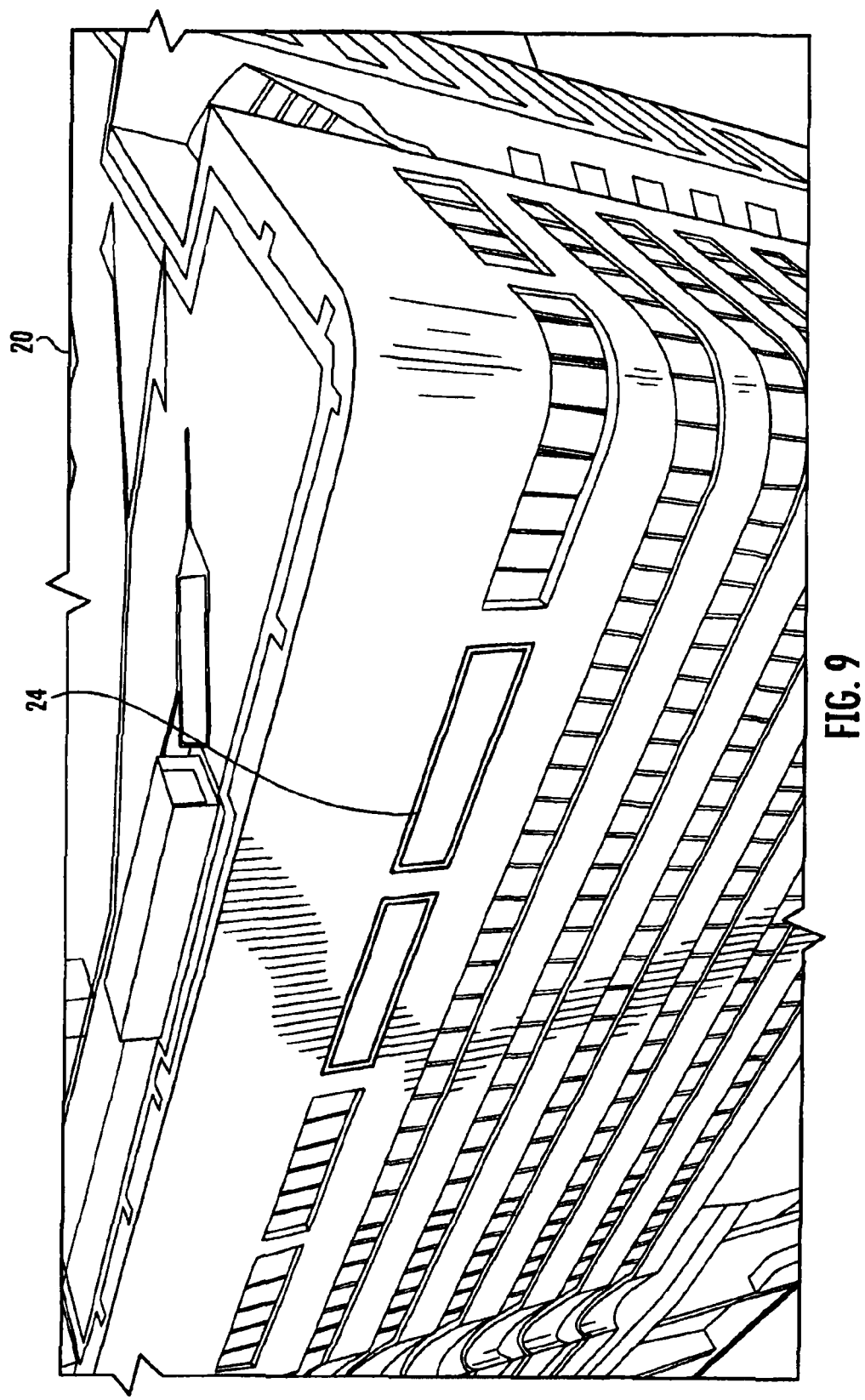
FIG. 9 illustrates the computerized 3D model depicted in FIG. 1 with the images of the real world windows replaced with their simulated versions.

As discussed above, a further methodology of the present invention permits the application of the texture contained in the palette entries corresponding to the selected image textures to the 3D model so as to improve the useable resolution of the 3D model. As would be understood, the application of the palette texture to the 3D model of the structure would permit a user of the present methodology to zoom in to the particular structure, e.g., the building 20 of FIG. 2, represented within the 3D model without the pixilation that would be normally be present. For example, FIGS. 5 and 9 illustrate the application of the palette textures to the selected and outlined image textures of FIGS. 3 and 7 (building surface 22 in FIG. 3 or windows 24 in FIG. 7).

Figure 6A:
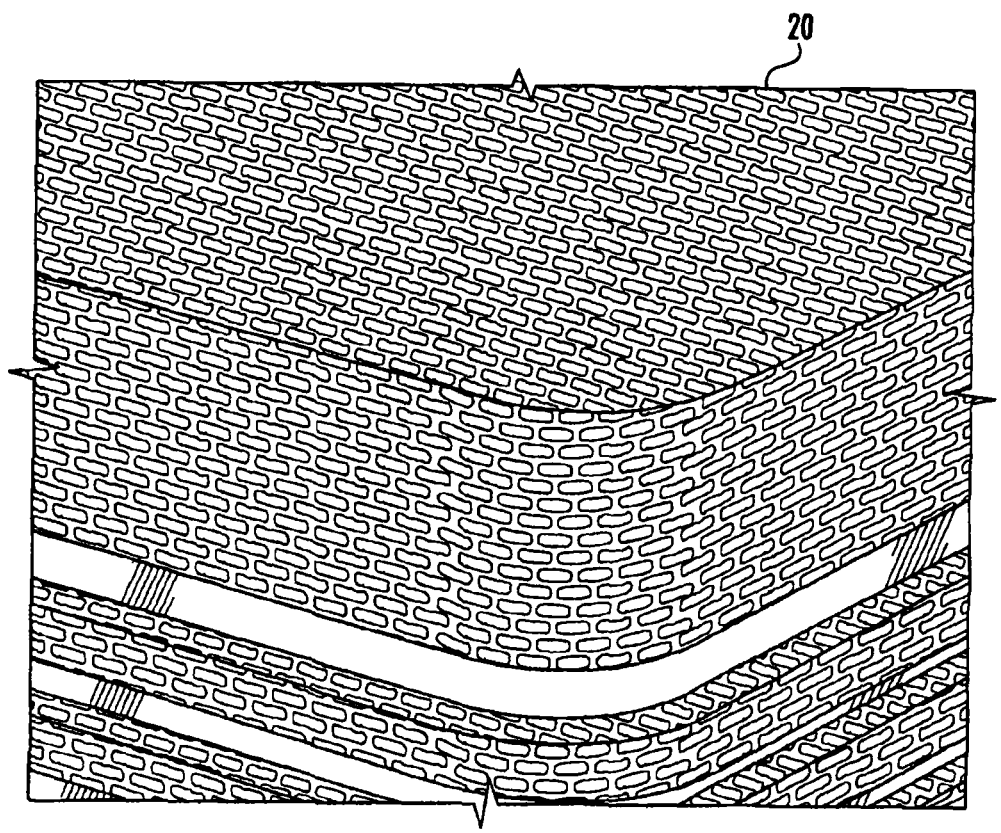
FIG. 6a is a zoomed in diagram of the model depicted in FIG. 6.

On a larger scale, FIG. 6 illustrates the building 20 shown in FIG. 2 wherein the original digital oblique image applied to and representing the building within the 3D model has been completely replaced by the palette texture as described above. FIG. 6*a* illustrates the same building 20 zoomed in so as to show the palette texture in greater detail. As can be seen, the zoomed in image shown in FIG. 6*a* is free from the normal pixilation as shown in the zoomed in image of FIG. 2.

As described above, the selected and outlined image textures would also be assigned the material properties associated with the palette entry corresponding to the image texture. In the case of the building 20 shown in FIG. 6, the image texture replaced by the palette texture would also include the associated material properties.

Figure 10:
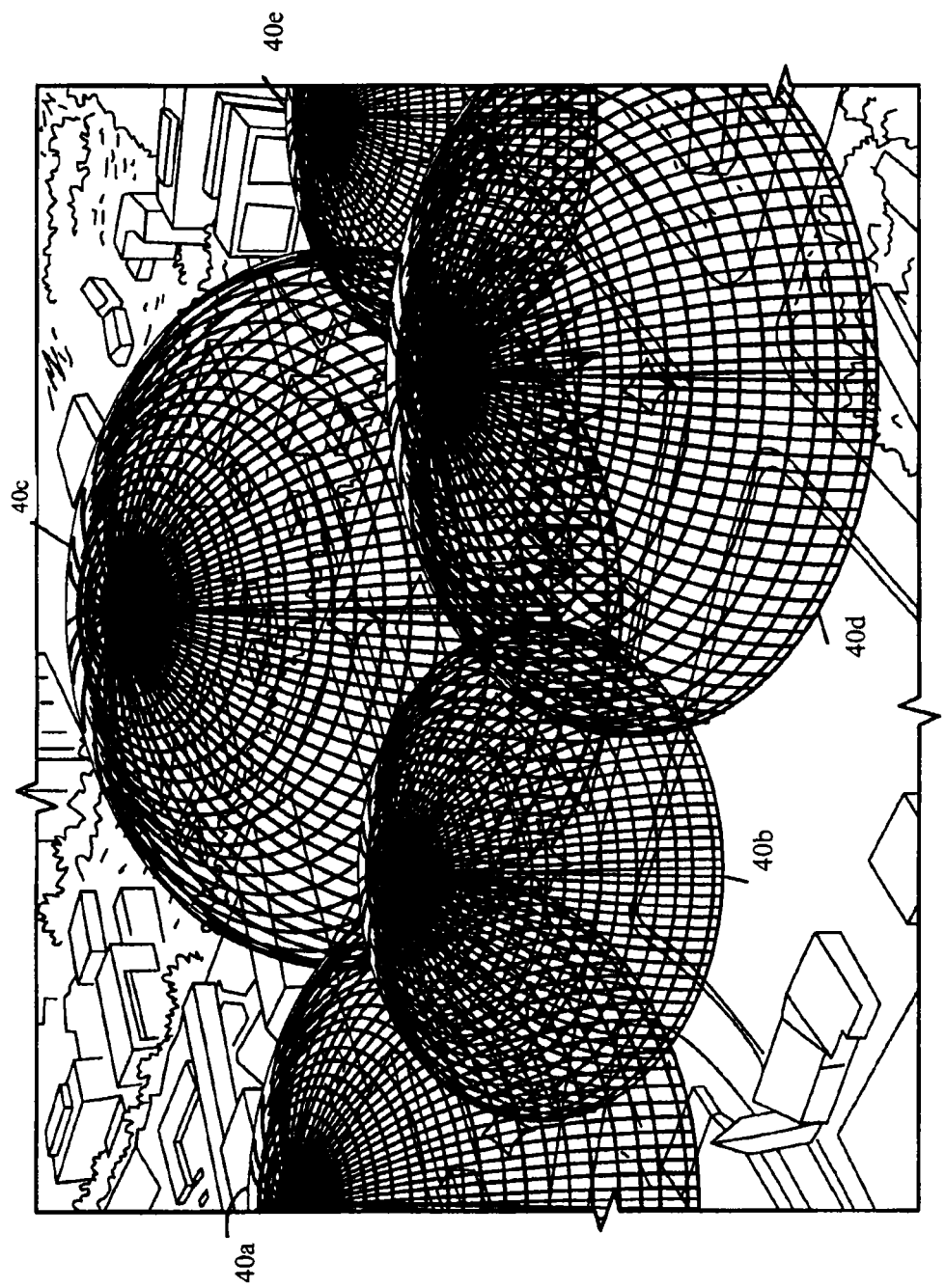
FIG. 10 illustrates a blast analysis model inside a 3D model.

Referring now to FIG. 10, the output model could also be loaded into an analysis tool such as Lockheed Martin's TOPSCENE with a plurality of threat domes 40 (shown individually as 40*a*-40*e*) overlaid on top of the 3D model. Building material attribution, i.e., consideration of the building material properties, on the 3D model would increase the predictive capability of a blast or ballistic penetration analysis. Threat domes 40*a*-40*e* would be understood to vary in size depending on the building material property assigned to a particular building for a given blast penetration analysis. That is, an analysis tool could take the material property assigned to structure(s) into consideration when analyzing different scenarios, e.g., a blast scenario, in order to provide improved predictive capabilities. For example, a blast occurring inside a structure constructed with glass walls would readily be understood to result in a different blast scenario than a similar blast occurring inside a structure constructed with brick walls.

Figure 11:
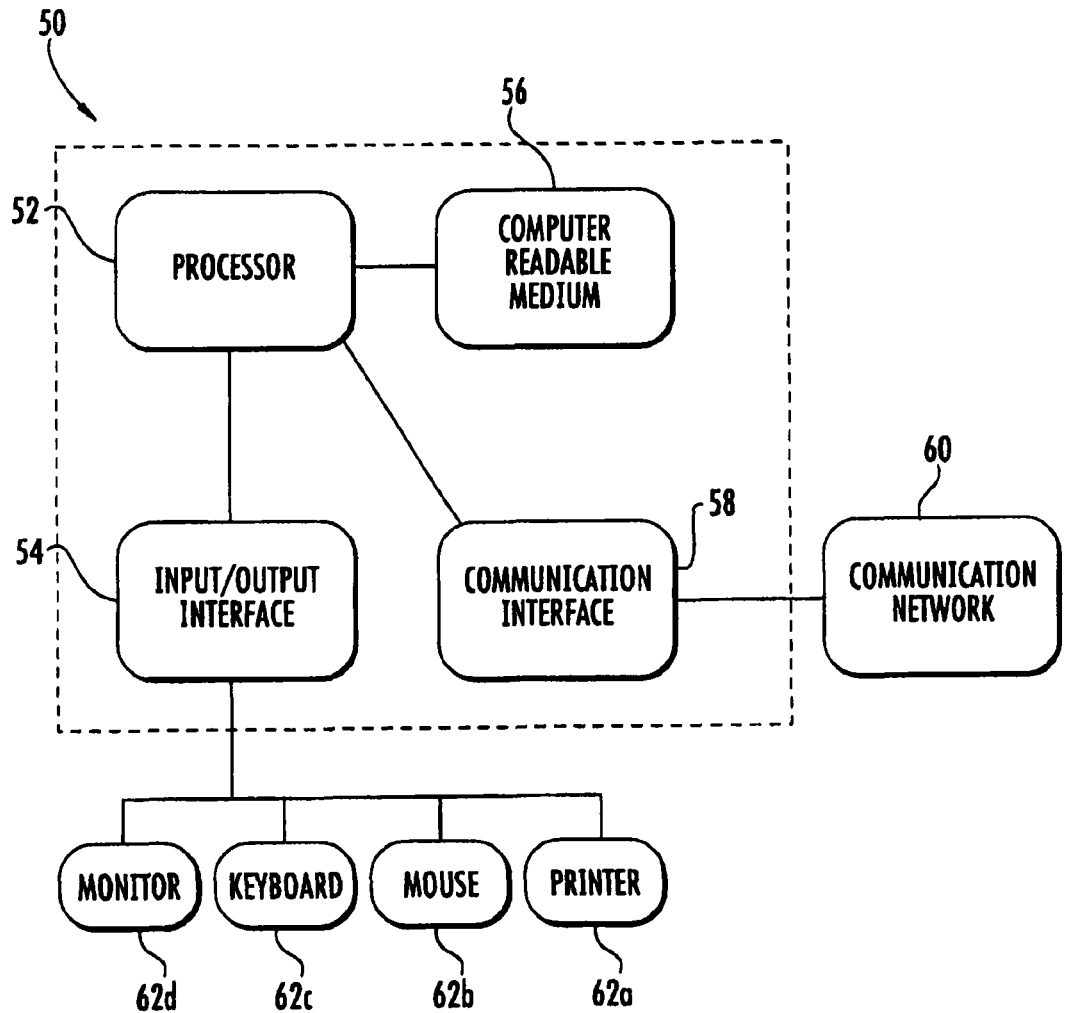
FIG. 11 is a block diagram of a computer system as used in the present invention.

It should be understood that the processes described above can be performed with the aid of a computer system 50 running image processing software adapted to perform the functions described above, and the resulting images and data are stored on one or more computer readable mediums. FIG. 11 illustrates a block diagram of an exemplary embodiment of a computer system 50 constructed in accordance with the present invention. The computer system 50 includes a processor 52 in communication with a computer readable medium 56, an input/output interface 54 and a communication interface 58. The input/output interface 54 is further in communication with input/output devices 62*a*-*d*. As would be understood in the art, the computer system 50 can further utilize additional input/output devices (not shown) which would permit a user to enter, process and produce an output of a 3D model constructed in accordance with the present invention. For example, the computer system 50 could further include a digital tablet, an optical scanner, an external computer readable medium and the like.

The communication interface 58 is in communication with communication network 60. Communication network 60 provides a mechanism for the computer system 50 to transmit and/or receive information between the computer system 50 and external devices/systems, such as digital images, 3D models and the like. Communication network 60 can be implemented using any commonly available communication mediums, such as wireless, wired, TCP/IP, fiber optic and the like.

Computer readable medium 56 permits storage and retrieval of digital information (data) and also computer executable code as utilized in the present invention.

Examples of a computer readable medium 56 include an optical storage device, a magnetic storage device, an electronic storage device or the like.

As would be understood in the art, the term "Computer System" as used herein means a system or systems that are able to embody and/or execute the logic of the processes described herein. The logic embodied in the form of software instructions or firmware may be executed on any appropriate hardware which may be a dedicated system or systems, or a general purpose computer system, or distributed processing computer system, all of which are well understood in the art, and a detailed description of how to make or use such computers is not deemed necessary herein. When the computer system is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the images, or thereafter or combinations thereof.

Although the foregoing invention has been described in some detail by way of illustration and example for purposes of clarity of understanding, it will be obvious to those skilled in the art that certain changes and modifications may be practiced without departing from the spirit and scope thereof, as described in this specification and as defined in the appended claims below.

What is claimed is:

1. A method of automatically transforming a computerized 3D model having portions of images utilized as image textures on one or more physical objects including one or more roofs represented in the computerized 3D model to include material property information for one or more regions of the image textures of the computerized 3D model, comprising the steps of:
   examining, using computer executable code operated on a computer, a portion of a first image texture having unknown material properties and applied to or to be applied to a represented roof in the computerized 3D model, by:
   comparing, using computer executable code operated on the computer, the portion of the first image texture of the represented roof in the computerized 3D model to second texture images of material entries in a palette of material entries stored on a non-transitory computer readable medium to determine a best match for the first image texture, the palette of material entries comprising a set of the second texture images, the second texture images associated with material properties of physical roofing materials, the material properties having material property information about the physical roofing materials;
   assigning the material entry in the palette that best matches the portion of the first image texture to the first image texture to indicate a physical material of the roof represented by the portion of the first image texture in the computerized 3D model; and
   storing the material property information of a selected material entry in the computerized 3D model as material property information of the roof.

2. The method of claim 1, wherein the method comprises the step of modifying an image resolution of at least one of the first image texture in the computerized 3D model and the second texture images of the material entries in the palette of material entries to match prior to the step of comparing the first image texture to the second texture images of the material entries in the palette of material entries.

3. The method of claim 1, wherein the material property information is stored in fields in the computerized 3D model.

4. The method of claim 1 wherein the material property information stored in the computerized 3D model includes a unique identifier for the selected material entry and wherein the method further comprises the step of retrieving the material property information from a list or database of material properties using the unique identifier.

5. The method of claim 2, wherein the material property information is stored in fields in the computerized 3D model.

6. The method of claim 1 wherein the material property information stored in the computerized 3D model includes a unique identifier for the selected material entry and, wherein the method further comprises the step of retrieving the material property information from a list or database of material properties using the unique identifier.

7. The method of claim 1, further comprising the step of selecting an entry in the palette of material entries as a simulated texture for at least one of the textures of the computerized 3D model.

8. The method of claim 7 further comprising the step of utilizing the simulated texture as the image texture of the computerized 3D model.

9. The method of claim 7 wherein the simulated texture is combined with the first image texture of the computerized 3D model.

10. The method of claim 7 wherein the simulated texture has an image resolution greater than an image resolution of the first image texture.

11. The method of claim 1, further comprising simulating with the computerized 3D model an impact on the roof represented in the computerized 3D model and predicting results of the impact based at least in part on the stored material property information of the roof.

12. A method of automatically transforming a 3D model image texture, comprising the steps of:
   using a computer system to perform the steps of:
   locating, with one or more processors executing computer executable instructions stored on one or more non-transitory computer readable medium, representations of predetermined structural roof elements in the 3D model image texture, utilizing an edge detection algorithm on the 3D model image texture;
   examining, using computer executable code operated on the computer system, at least a portion of the representations of predetermined structural roof elements in the 3D model image texture, by:
   comparing, with the one or more processors executing computer executable instructions stored on the one or more non-transitory computer readable medium, the representations of predetermined structural roof elements in the 3D model image texture to texture images of entries in a palette of structural roof element textures representing structural roof elements stored on the computer system to determine best matches for the representations of predetermined structural elements;
   assigning, with the one or more processors executing computer executable instructions stored on the one or more non-transitory computer readable medium, the entries in the palette of structural roof element textures with the best match to the structural roof element found in the 3D model image texture; and inserting, with the one or more processors executing computer executable instructions stored on the one or more non-transitory computer readable medium, material property information about the material from the entries in the palette of structural roof element textures with the best match into a computerized 3D model at the same size and position as the structural roof elements as found in the 3D model image texture by the edge detection algorithm.

13. The method of claim 12, further comprising the step of modifying an image resolution of the texture images of entries in the palette of structural roof elements to match an image resolution of the 3D model image texture.

14. The method of claim 12, wherein the step of inserting material property information is defined further as storing material property information of the entries in the palette of structural roof element textures with the best match in a field in the computerized 3D model directly.

15. The method of claim 12, wherein the step of inserting material property information is defined further as the steps of storing a unique identifier for the entries in the palette of structural roof element textures with the best match in the computerized 3D model and subsequently using the unique identifier to retrieve the material property information from at least one of a list and a database of material properties.

16. The method of claim 12, further comprising the step of using the entries in the palette of structural roof element textures with the best match as simulated textures for the computerized 3D model as indicated by a size and position of the representations of predetermined structural roof elements.

17. The method of claim 16, wherein the simulated textures have an image resolution greater than an image resolution of an actual 3D model image texture, and wherein the method further comprises the step of combining the simulated texture with the actual 3D model image texture of the structural roof element at the size and position of the structural roof element as found in the 3D model image texture by the edge detection algorithm.

18. A system for automatically transforming a computerized 3D model having portions of images utilized as image textures on one or more physical objects including one or more roofs represented in the computerized 3D model to include material property information for one or more regions of the image textures of the computerized 3D model, the system comprising:

a computer comprising;

a processor; and a non-transitory computer readable medium storing computer executable code that when executed by the processor causes the computer to:

examine at least a portion of a first image texture having material properties and applied to or to be applied to a roof represented in a computerized 3D model, by comparing the first image texture of the roof of the computerized 3D model to second texture images of material entries in a palette of material entries stored on the non-transitory computer readable medium, the palette of material entries comprising a set of the second texture images, the second texture images associated with material properties of physical roof materials, the material properties having material property information about the physical roof material;

determine a best match for the first image texture; and assign the material entry in the palette that best matches the first image texture to the first image texture to indicate a physical roof material of the roof represented by the portion of the first image texture in the computerized 3D model, the non-transitory computer readable medium storing the material property information of a selected material entry in the computerized 3D model.

19. The system of claim 18, wherein the computer executable code when executed by the processor further causes the computer to simulate with the computerized 3D model an impact on the roof represented in the computerized 3D model and predict results of the impact based at least in part on the assigned material property information of the roof.

* * * * *

UNITED STATES PATENT AND TRADEMARK OFFICE
CERTIFICATE OF CORRECTION

PATENT NO. : 9,959,667 B2
APPLICATION NO. : 15/142361
DATED : May 1, 2018
INVENTOR(S) : Stephen Schultz It is certified that error appears in the above-identified patent and that said Letters Patent is hereby corrected as shown below:

On the Title Page

On Page 4, References Cited, Other Publications, First Column, Line 39:
After ""POSTrack V5 Specifications" 2005." insert -- "Remote Sensing for Resource Inventory Planning and Monitoring", Proceeding of the Second Forest Service Remote Sensing applications Conference - Slidell, Louisiana and NSTL, Mississippi, April 11-15, 1988. --

Signed and Sealed this
Third Day of July, 2018

Andrei Iancu
*Director of the United States Patent and Trademark Office*